H. W. SANFORD.
WHEEL CONSTRUCTION.
APPLICATION FILED JUNE 22, 1911.
1,031,590.
Patented July 2, 1912.
2 SHEETS—SHEET 1.
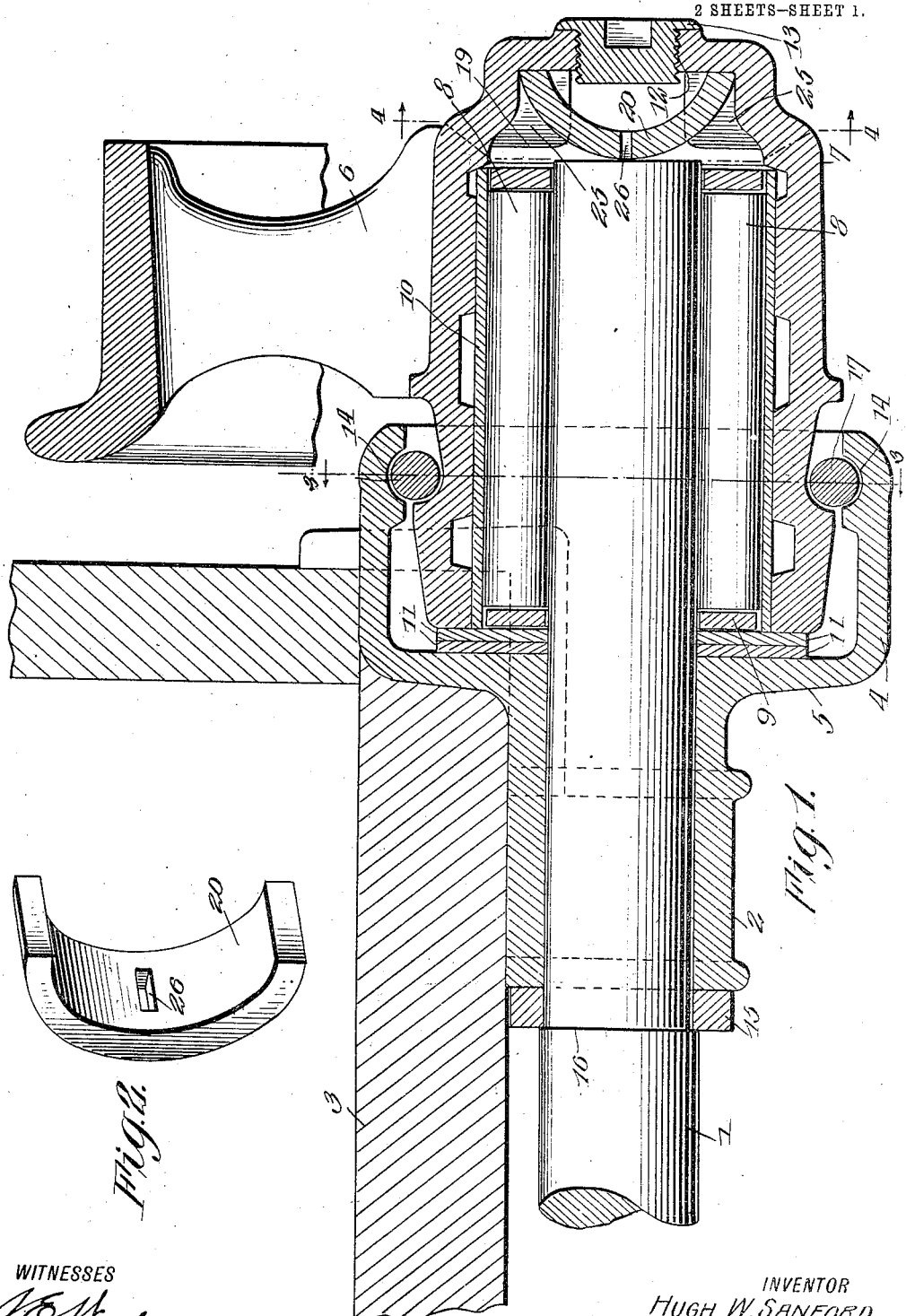
WITNESSES
INVENTOR
HUGH W. SANFORD
ATTORNEYS

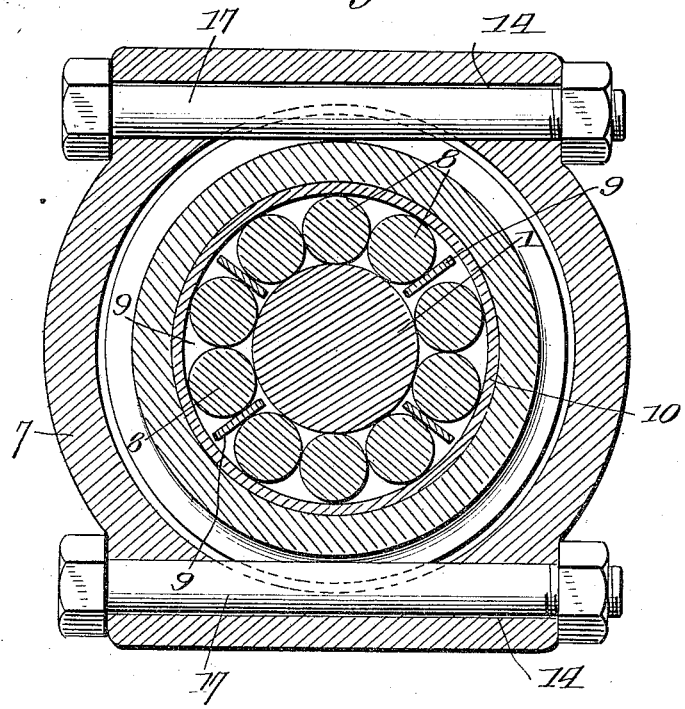
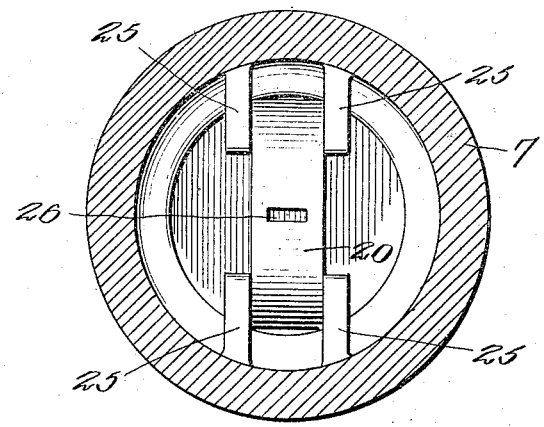

UNITED STATES PATENT OFFICE.

HUGH W. SANFORD, OF KNOXVILLE, TENNESSEE.

WHEEL CONSTRUCTION.

1,031,590.　　　　　Specification of Letters Patent.　　Patented July 2, 1912.

Application filed June 22, 1911. Serial No. 634,700. REISSUED

*To all whom it may concern:*

Be it known that I, HUGH W. SANFORD, a citizen of the United States, and a resident of Knoxville, in the county of Knox and State of Tennessee, have invented a new and Improved Wheel Construction, of which the following is a full, clear, and exact description.

My invention is an improvement in wheel construction, and has for its object the provision of means for preventing wear on the hub and bearing sleeve of wheel mountings, wherein the wheel is journaled on the axle.

In the drawings:—Figure 1 is a longitudinal vertical section of the improvement, and Fig. 2 is a perspective view of the thrust block, and, Figs. 3 and 4 are sections on the lines 3—3 and 4—4 respectively of Fig. 1.

The present embodiment of the invention comprises an axle 1, journaled in a bearing sleeve 2 which is secured to the frame 3 of a car, in any suitable manner. The bearing is composed of the bearing proper encircling the axle, and a radially offset annular flange 4, connected to the bearing by a web 5.

A wheel 6 is provided with a hub 7, of greater internal diameter than the axle, and the hub is journaled on the axle, a roller bearing 8 being interposed between the hub and the axle. A roller cage 9 is provided for supporting the rollers, and a collar 15 encircles the axle, between an annular shoulder 16 on the axle, and the inner end of the bearing sleeve 2. The hub is provided with a bushing 10 between the rollers and the inner surface of the hub, and a plurality of washers 11, are arranged on the axle, between the web 5 and the end of the hub. The said hub is closed at its outer end, and provided with a threaded oil opening 12, in which is threaded a plug 13. The flange 4 of the bearing extends outwardly over the inner end of the hub, and above and below the axle a transverse bore 14 is provided, extending through the flange and the bearing. The central portion of each bore is formed by registering grooves in the inner surface of the flange, and in the outer surface of the hub, the latter groove being annular.
A key 17, in the form of a bolt is passed through each bore, and is held in place in any suitable manner. The keys hold the bearing and hub in proper relative position, since each key is engaged with both parts, inside the bearing. The washers 11 receive the thrust of the hub, and prevent undue wear of the web 5 of the hub. When the washers become worn, they may be replaced by others. The life of the bearing is thus greatly lengthened. It will be noticed that an oil chamber 19 is formed between the outer end of the axle and the closed end of the hub. An arc-shaped thrust block 20 is inserted in the said chamber, and the ends of the block bear against the inner face of the closed end of the hub, while the central portion of the block bears against the ends of the axle. The inner end of the plug 13 extends between the ends of the block, and the block is held in place by lugs 25, which are cast in the end of the hub. An opening 26 is provided in the thrust block for permitting the insertion of a tool in placing or removing the block.

The block receives the end thrust of the axle, and when worn may be removed and replaced by a new block. The principal defect in the construction in question, that is in loose wheels, is the wear from end thrust, in rounding curves. In the present construction, all end thrust of the wheel pushing inwardly, is received by the interchangeable blocks or washers at the center of the axle, thus reducing wear and friction to a minimum. The lugs 25 in addition to their function of holding the thrust block in place, also act to take the end thrust, should the thrust washer 20 be omitted, or lost from the wheel, at least until new thrust washers can be inserted. The peculiar form of thrust block 20 places all of the end thrust of the wheel pushing inwardly, on the center of the axle.

I claim:—

1. The combination with the axle, of a bearing sleeve in which the axle is journaled, a wheel having a hub journaled on the axle, a roller bearing between the hub and the axle, a washer at each end of the rollers, the bearing sleeve having a radially offset annular flange overlying the inner end of the hub, and having a web connecting the flange to the bearing sleeve, a plurality of interchangeable washers encircling the axle between the hub and the web, the flange having a transverse bore above and below the axle, the hub having an annular groove registering with the bore, a locking bolt passed through each bore to hold the wheel on the axle, the outer end of the hub being closed, and having an oil opening at the center, a filling plug in the opening, and an arc-shaped bearing block between the said hub and the adjacent end of the axle, the body of the block engaging the axle end, and the ends thereof engaging the hub on each side of the inner end of the plug.

2. The combination with the axle, of a bearing sleeve in which the axle is journaled, a wheel having a hub journaled on the axle, the bearing sleeve having a radially offset annular flange overlying the inner end of the hub, and having a web connecting the flange to the bearing sleeve, a plurality of interchangeable washers encircling the axle between the hub and the web, the flange having a transverse bore above and below the axle, the hub having an annular groove registering with the bore, a locking bolt passed through each bore to hold the wheel on the axle, the outer end of the hub being closed, and having an oil opening at the center, a filling plug in the opening, and an arc-shaped bearing block between the said hub and the adjacent end of the axle, the body of the block engaging the axle end, and the ends thereof engaging the hub on each side of the inner end of the plug.

3. The combination with the axle, of a bearing sleeve in which the axle is journaled, a wheel having a hub journaled on the axle, a roller bearing between the hub and the axle, a washer at each end of the rollers, the bearing sleeve having a radially offset annular flange overlying the inner end of the hub, and having a web connecting the flange to the bearing sleeve, a plurality of interchangeable washers encircling the axle between the hub and the web, the flange having a transverse bore above and below the axle, the hub having an annular groove registering with the bore, a locking bolt passed through each bore to hold the wheel on the axle, the outer end of the hub being closed, and having an oil opening at the center, a filling plug in the opening, and a bearing block between the end of the axle and the end of the hub.

4. The combination with the axle, of a bearing sleeve in which the axle is journaled, a wheel having a hub journaled on the axle, the sleeve having a radially offset flange extending over the inner end of the hub, and having a web connecting the flange to the sleeve, means for locking the hub to the flange of the sleeve, interchangeable washers encircling the axle between the end of the hub and the web, the outer end of the hub being closed and having an oil opening, a plug in the opening, and an arc-shaped bearing block between the end of the axle and the end of the hub, and bearing with its body against the end of the axle, the ends of the block being seated on each side of the plug.

5. The combination with the axle, of a bearing sleeve in which the axle is journaled, a wheel having a hub journaled on the axle, the sleeve having a radially offset flange extending over the inner end of the hub, and having a web connecting the flange to the sleeve, means for locking the hub to the flange of the sleeve, interchangeable washers encircling the axle between the end of the hub and the web, and an arc-shaped thrust block between the outer end of the axle and the hub, the body of the block being seated against the axle and the ends of the block engaging the hub.

6. The combination with the axle, of a bearing sleeve in which the axle is journaled, a wheel having a hub journaled on the axle, the sleeve having a radially offset flange extending over the inner end of the hub, and having a web connecting the flange to the sleeve, interchangeable washers encircling the axle between the end of the hub and the web, and a thrust block between the outer end of the axle and the hub said block having a convexed face for engaging the axle.

7. The combination with the axle, of a bearing sleeve in which the axle is journaled, a wheel having a hub journaled on the axle, the sleeve having a radially offset flange extending over the inner end of the hub, and having a web connecting the flange to the sleeve, means for locking the hub to the flange of the sleeve, and an arc-shaped bearing block between the outer end of the axle and the hub, the body of the block being seated against the axle and the ends of the block engaging the hub.

8. The combination with the axle, of a wheel having a hub journaled on the axle, the inner end of the said hub having an annular groove, a fixed bearing in which the axle is journaled, said bearing having a marginal flange overlying the inner end of the hub, said flange having transverse openings, one above and one below the hub, and registering with the annular groove, and bolts passing through the said openings and engaging the groove for holding the wheel in place, the outer end of the hub being reduced, and a thrust block between the outer end of the axle, and the reduced end of the hub, said hub having lugs engaging the opposite sides of the block to hold the said block in place.

9. The combination with the axle, of a wheel having a hub journaled on the axle, the inner end of the said hub having an annular groove, a fixed bearing in which the axle is journaled, said bearing having a marginal flange overlying the inner end of the hub, said flange having transverse openings, one above and one below the hub, and registering with the annular groove, and bolts passing through the said openings, and engaging the groove for holding the wheel in place, the outer end of the hub being reduced, and a thrust block between the outer end of the axle, and the reduced end of the hub.

10. The combination with the axle, of a wheel having a hub journaled on the axle, the outer end of the hub being reduced, and a thrust block arranged between the outer end of the axle, and the reduced end of the hub, said hub having lugs for engaging the opposite sides of the block to hold the said block in place.

11. The combination with the axle, of a wheel journaled on the axle, the outer end of the hub being reduced, and an arc-shaped thrust block arranged between the outer end of the axle and the reduced end of the hub, the ends of the block engaging the hub, and the body the end of the axle.

12. The combination with the axle, of a wheel journaled on the axle, the outer end of the hub being reduced, and an arc-shaped thrust block between the outer end of the axle and the reduced end of the hub, the body of the block engaging the end of the axle, said block arching over the opening at the outer end of the hub.

13. The combination with the axle, of a wheel journaled on the axle, the outer end of the hub of the wheel having a central oil opening, and a thrust block arching across the opening and engaging the end of the axle intermediate its ends.

HUGH W. SANFORD.

Witnesses:
L. O. BLALOCK,
R. L. BREWER.

Copies of this patent may be obtained for five cents each, by addressing the "Commissioner of Patents, Washington, D. C."